United States Patent
Edamatsu et al.

(10) Patent No.: US 7,570,419 B2
(45) Date of Patent: Aug. 4, 2009

(54) QUANTUM ENTANGLEMENT PHOTON-PAIR PRODUCING DEVICE AND QUANTUM ENTANGLEMENT PHOTON PAIR PRODUCING METHOD

(75) Inventors: Keiichi Edamatsu, Natori (JP); Ryosuke Shimizu, Sendai (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 12/224,289

(22) PCT Filed: Mar. 1, 2007

(86) PCT No.: PCT/JP2007/053974

§ 371 (c)(1),
(2), (4) Date: Aug. 22, 2008

(87) PCT Pub. No.: WO2007/102408

PCT Pub. Date: Sep. 13, 2007

(65) Prior Publication Data

US 2009/0016386 A1    Jan. 15, 2009

(30) Foreign Application Priority Data

Mar. 3, 2006  (JP) .............................. 2006-058437

(51) Int. Cl.
*G02F 1/35* (2006.01)
*H04L 9/00* (2006.01)

(52) U.S. Cl. .................... 359/326; 398/152; 372/21; 380/278

(58) Field of Classification Search ......... 359/326–330; 398/152; 372/21; 385/122; 380/277, 278
See application file for complete search history.

(56) References Cited

U.S. PATENT DOCUMENTS 7,211,812 B2 *  5/2007  Takeuchi ................ 250/493.1

(Continued)

FOREIGN PATENT DOCUMENTS

| JP | 2004-272082 | 9/2004 |
| JP | 2005-172910 | 6/2005 |
| JP | 2005-257939 | 9/2005 |

OTHER PUBLICATIONS

Kim, T. et al. Phase-stable source of polarization-entangled photons using a polarization Sagnac interferometer, Physical Review A 73 (Jan. 2006), 012316.

(Continued)

*Primary Examiner*—Hemang Sanghavi
(74) *Attorney, Agent, or Firm*—Harness, Dickey, Pierce, P.L.C.

(57) ABSTRACT

In one embodiment of the present invention, a quantum entangled photon-pair producing device is disclosed which includes a superposed state generating device for generating a superposed state of photon-pairs entering through N ($N \geq 2$) different incident optical paths and being composed of photons having different polarization directions, and a light-guide device for separating the photon-pairs entering through the N (e.g. N is two) incident optical paths into photons having a first polarization direction (e.g. horizontally polarized light) and those having a second polarization direction (e.g. vertically polarized light) and guiding the photons having the first polarization direction and entering through the i-th ($1 \leq i \leq N$) (e.g. the first) incident optical path and photons having the second polarization direction and entering through the (N−i+1) (e.g. the second) incident optical path to the i-th (e.g. the first) exit optical path through optical paths having the same optical path length. Therefore, quantum entangled photons of N channels having a quantum correlation with regard to the polarization direction can be produced. With this, a quantum entangled photon-pair producing device capable of producing quantum entangled photon-pairs of multi-channel having a quantum correlation with regard to the polarization direction with high production efficiency is realized.

11 Claims, 6 Drawing Sheets

U.S. PATENT DOCUMENTS

| | | | |
|---|---|---|---|
| 7,486,433 B2* | 2/2009 | Jarutis et al. | 359/326 |
| 2005/0094142 A1 | 5/2005 | Takeuchi | |
| 2008/0037996 A1* | 2/2008 | Spillane et al. | 398/152 |
| 2009/0022322 A1* | 1/2009 | Trifonov | 380/278 |

OTHER PUBLICATIONS

Shi, B.-S. Tomita, A. Preparation of a pulsed polarization entangled photon pair via interference, Optics Communication, vol. 235, No. 4/6 (2004), p. 247-252.

Sanaka, K. et al. New High-Efficiency Source of Photon Pairs for Engineering Quantum Entanglement, Physical Review Letters, vol. 86, No. 24 (2001), p. 5620-5623.

Kwiat, P. G. et al. New High-Intensity Source of Polarization -Entangled Photon Pairs, Physical Review Letters. vol. 75, No. 24 (1995), p. 4337-p. 4341.

Kwiat, P. G. et al. Ultrabright source of polarization-entangled photons, Physical Review. A 60 (199), R773-R776, 1999.

Kim, Y. -H et al. Interferometric Bell-state preparation using femtosecond-pulse-pumped spontaneous parametric down-conversion, Physical Review. A 63 (2001), p. 062301-1-p. 062301-11.

Fiorentino, M. Et al. Gerneration fo ultrabright tunable polarization entanglement without spaital, spectral, or temporal constraints, Physical Review. A 69 (2004), p. 041801-1-p. 041801-4.

Shimizu, R et al. Gerneration of polarization entaglement from spatially correlated phontons in spontaneous parametric down-conversion, Physical Review A 77 (2008), p. 032338-1-p. 032338-4.

Shimizu, R et al. Polarization Entanglement Converted from Spatially Correlated Phonton Pairs, Coherence and Quantum Optics IX (Proceedings of the ninth Rochester Conference on Coherence and Quantum Optics), 2008, p. 322-p. 323 Place fo disclosure: The ninth Rochester Conference on Coherence and Quantum Optics, Date of Conference: Jun. 10, 2007.

Shimizu, R et al. Gerneration of polarization entangled photons using a spatial correlation in spontaneous parametric down-conversion, Proceedings of the 8th International Conference on Quantum Communication, Measurement and computing, NICT Press, 2007 Place of disclosure: The 8th International Conference on Quantum Communication, Measurement and Computing.

* cited by examiner

F I G. 6

QUANTUM ENTANGLEMENT PHOTON-PAIR PRODUCING DEVICE AND QUANTUM ENTANGLEMENT PHOTON PAIR PRODUCING METHOD

TECHNICAL FIELD

The present invention relates to a device and a method for producing quantum entangled photon pairs, in particular, quantum entangled photon pairs having polarization entanglement.

BACKGROUND ART

Cryptographic technology in information transmission has been studied in response to recent development of information-communication technologies such as electronic commerce and electronic mails. Quantum cryptography has been drawing much attention recently as the cryptographic technology.

In the quantum cryptography, security of communication is guaranteed by a physical phenomenon based on Heisenberg uncertainty principle in quantum mechanics. In the uncertainty principle, a quantum state is changed by observation, and therefore wiretapping (observation) of communication is inevitably detectable. This allows to take measures against the wiretapping, such as shutting down the communication, thus, the wiretapping is considered to be physically impossible. Additionally, it is impossible to replicate particles due to the uncertainty principle.

Quantum teleportation is one of the key features of the quantum cryptography. The quantum teleportation is a technique for transmitting only quantum information of the particles. The quantum teleportation is achieved by information exchanges between photons by utilizing a quantum entangled state. A photon pair in the quantum entangled state has such a property that a quantum state of one of the photons is determined when that of the other is determined. This property is not dependent on a distance between the two photons.

In order to achieve the quantum teleportation, it is required to produce the photon pairs in the quantum entangled state. The photon pairs in the quantum entangled state can be produced by parametric down-conversion that is one of the second-order nonlinear optical processes.

As a technique for producing the quantum entangled photon pairs by using the parametric down-conversion, Non-Patent Citation 1 discloses a technique for spontaneously producing quantum entangled photon pair from a crystal, the photon pair being composed of photons whose polarization directions are perpendicular to each other, based on type II phase matching condition. In addition, Non-Patent Citation 2 discloses a technique for producing a quantum entangled photon pair in two nonlinear optical crystals superimposed on each other and oriented at 90° with each other, by using the parametric down-conversion based on type I phase matching condition, the photon pair being composed of photons whose polarization directions are parallel to each other.

Further, a quantum entangled photon pair producing device utilizing a Mach Zehnder interferometer has been known as a technique for producing quantum entangled photon pairs by using photon pairs outputted from nonlinear optical crystals in an axial direction of pump light (see Non-Patent Citations 3 and 4). The quantum entangled photon pair producing devices described above produce the quantum entangled photon pairs by combining, by means of a polarization beam splitter provided on an output side of the interferometer, the photon pairs outputted respectively from the two nonlinear optical crystals.

[Non-Patent Citation 1]
"New high-intensity source of polarization-entangled photon pairs", P. G. Kwiat, et al., Phys. Rev. Lett. 75, 4337 (1995).

[Non-Patent Citation 2]
"Ultrabright source of polarization-entangled photons", P. G. Kwiat, et al., Phys. Rev. A 60, R773 (1999).

[Non-Patent Citation 3]
"Interferometric Bell-state preparation using femtosecond-pulse pumped spontaneous parametric down-conversion", Yoon-Ho Kim, et al., Phys. Rev. A 63, 062301 (2001).

[Non-Patent Citation 4]
"Generation of ultrabright tunable polarization entanglement without spatial, spectral, or temporal constrains", M. Fiorentino, et al., Phys. Rev. A 69, 041801 (R) (2004).

DISCLOSURE OF INVENTION

However, the techniques for producing the quantum entangled photon pairs from the nonlinear optical crystals by using the parametric down-conversion cannot increase production efficiency of the photon pairs by using a wave-guiding structure or the like. A technique for producing the quantum entangled photon pairs by using a wave-guiding type quasi phase matching element has been known as a solution to the problem. However, this technique has a problem in that the photon pairs can be produced only in the axial direction of pump light.

Also, the conventional quantum entangled photon pair producing device utilizing the Mach Zehnder interferometer can produce only one pair of the quantum entangled photon pair, and cannot obtain quantum entangled photon pairs of multi-channel. Additionally, two crystals of a same type are required to produce the quantum entangled photon pair by using the Mach Zehnder interferometer.

The present invention is accomplished in view of the problems above, and an object of the present invention is to provide a quantum entangled photon pair producing device capable of producing polarization entangled photon pairs of multi-channel (an arbitrary number of channels, which is not less than 2) with high efficiency.

A quantum entangled photon pair producing device according to the present invention contains superposition state generating means for generating a superposition state of photon pairs entering through an N (N≧2) number of different incident optical paths and being composed of photons having different polarization directions, and light-guide means for separating each of the photon pairs entering through the N number of incident optical paths into a photon having a first polarization direction and a photon having a second polarization direction, and guiding the photon entering through an i-th (1≦i≦N) incident optical path and having the first polarization direction and the photon entering through an (N−i+1)-th incident optical path and having the second polarization direction to the i-th exit optical path through optical paths having a same optical path length.

According to the structure above, the superposition state generating means causes a superposition state $|\Psi_{in}\rangle$ of photon pairs $|H_1, V_1\rangle, |H_2, V_2\rangle, \ldots, |H_N, V_N\rangle$ entering through N (N≧2) different incident optical paths. The term "$|H_1, V_i\rangle$" here indicates a state vector of a photon pair composed of a photon $|H_i\rangle$ entering through i-th incident optical path and having a first polarization direction (e.g. horizontally polarized light) and a photon $|V_i\rangle$ entering through i-th incident optical path and having a second polarization direction (e.g. vertically polarized light).

According to the structure above, by means of the light-guide means, each photon pair $|H_i, V_i\rangle$ is separated into the photon $|H_i\rangle$ having the first polarization direction and the photon $|V_i\rangle$ having the second polarization direction. Thereafter the photon $|H_1\rangle$ entering through the first incident optical path and having the first polarization direction is guided to the first exit optical path, and the photon $|H_2\rangle$ entering through the second incident optical path and having the first polarization direction is guided to the second exit optical path. In this manner, the photon $|H_N\rangle$ entering through the N-th incident optical path and having the first polarization direction is guided to the N-th exit optical path. Meanwhile, the photon $|V_1\rangle$ entering through the first incident optical path and having the second polarization direction is guided to the N-th exit optical path, and the photon $|V_2\rangle$ entering through the second incident optical path and having the second polarization direction is guided to the (N−1)-th exit optical path. In this manner, the photon $|V_N\rangle$ entering through the N-th incident optical path and having the second polarization direction is guided to the first exit optical path. Provided that the polarization directions of the photons are not changed by the light-guide means, a superposition state $|\Psi_{in}\rangle$ of photon pairs $|H_1, V_1\rangle, |H_2, V_2\rangle, \ldots, |H_N, V_N\rangle$ are converted to a superposition state $|\Psi_{out}\rangle$ of photon pairs $|H_1', V_N'\rangle, |H_2', V_{N-1}'\rangle, \ldots, H_N', V_1'\rangle$. The term "$|H_{i'}, V_{j'}\rangle$" here indicates a state vector of a photon pair composed of a photon $|H_{i'}\rangle$ outputted from the i'-th exit optical path and having the first polarization direction and a photon $|V_{j'}\rangle$ outputted from the j'-th exit optical path and having the second polarization direction.

That is, the quantum entangled photon pair producing device has such an effect that quantum entangled photon pairs $|\Psi_{out}\rangle$ of N channels, which have polarization entanglement, can be produced.

Additionally, the light-guide means of the present invention may be one that converts the polarization directions of the photons from the first polarization direction to the second polarization direction, or from the second polarization direction to the first polarization direction, on the process of guiding the photons from the incident optical path to the exit optical path. Even in this case, the light-guide means still converts a superposition state $|\Psi_{in}\rangle$ of photon pairs $|H_1, V_1\rangle, |H_2, V_2\rangle, \ldots, |H_N, V_N\rangle$ to a superposition state $|\Psi_{out}\rangle$ of photon pairs $|H_1', V_N'\rangle, |H_2', V_{N-1}'\rangle, \ldots, |H_N', V_1'\rangle$, and thereby producing quantum entangled photon pairs $|\Psi_{out}\rangle$ of N channels, which have polarization entanglement.

The light-guide means utilizes a Michelson interferometer, for example.

It is preferable that the quantum entangled photon pair producing device according to the present invention includes the superposition state generating means containing a nonlinear optical crystal for producing photon pairs from pump light entered the nonlinear optical crystal and a slit for allowing passage of the photon pairs produced by the nonlinear optical crystal without separating into individual photons, and for dividing an optical path of the photon pairs into incident optical paths in number of N.

According to the structure above, the slit cause a superposition state $|\Psi_{in}\rangle$ of photon pairs $|H_1, V_1\rangle, |H_2, V_2\rangle, \ldots, |H_N, V_N\rangle$ entering through N ($N \geq 2$) different incident optical paths. Thus, the structure has such an effect that the quantum entangled photon pair producing device for producing photon pairs $|\Psi_{out}\rangle$ of N channels can be attained simply and inexpensively.

It is preferable that the quantum entangled photon pair producing device according to the present invention includes the superposition state generating means containing a beam splitter for dividing, into optical paths in number of N, an optical path of pump light entered the beam splitter and a wave-guiding type quasi phase matching element having wave-guiding paths in number of N for producing photon pairs with the pump light divided by the beam splitter and for allowing the photon pairs enter the incident optical paths.

According to the structure above, photon pairs produced in wave-guiding paths in number of N in the wave-guiding type quasi phase matching element with the pump light divided by the beam splitter enters the incident optical paths in number of N. This causes a superposition state $|\Psi_{in}\rangle$ of photon pairs $|H_1, V_1\rangle, |H_2, V_2\rangle, \ldots, |H_N, V_N\rangle$ entering through N ($N \geq 2$) different incident optical paths.

The structure above increases occurrence ratio of the photon pairs by producing the photon pairs with the pump light kept in the wave-guiding paths in the wave-guiding type quasi phase matching element. Moreover, because the photon pairs may be produced in wave-guiding paths in number of N, it is possible to further increase the occurrence ratio of the photon pairs compared to a case where the photon pairs are produced in merely one wave-guiding path.

A quantum entangled photon pair producing method according to the present invention includes the superposition state generating step for generating a superposition state of photon pairs entering through an N ($N \geq 2$) number of different incident optical paths and being composed of photons having different polarization directions and the light-guide step for separating each of the photon pairs entering through the N number of incident optical paths into a photon having a first polarization direction and a photon having a second polarization direction, and guiding the photon entering through an i-th ($1 \leq i \leq N$) incident optical path and having the first polarization direction and the photon entering through an (N−i+1)-th incident optical path and having the second polarization direction to the i-th exit optical path through optical paths having a same optical path length.

According to the structure above, in the step for generating the superposition state, a superposition state $|\Psi_{in}\rangle$ of photon pairs $|H_1, V_1\rangle, |H_2, V_2\rangle, \ldots, |H_N, V_N\rangle$ entering through N ($N \geq 2$) different incident optical paths is caused. The term a "$|H_i, V_i\rangle$" here indicates a state vector of a photon pair composed of a photon $|H_i\rangle$ entering through i-th incident optical path and having a first polarization direction (e.g. horizontally polarized light) and a photon $|V_i\rangle$ entering through i-th incident optical path and having a second polarization direction (e.g. vertically polarized light).

According to the structure above, in the light-guide step, each photon pair $|H_i, V_i\rangle$ is separated into the photon $|H_i\rangle$ having the first polarization direction and the photon $|V_i\rangle$ having the second polarization direction. Thereafter the photon $|H_1\rangle$ entering through the first incident optical path and having the first polarization direction is guided to the first exit optical path, and the photon $|H_2\rangle$ entering through the second incident optical path and having the first polarization direction is guided to the second exit optical path. In this manner, the photon $|H_N\rangle$ entering through the N-th incident optical path and having the first polarization direction is guided to the N-th exit optical path. Meanwhile, the photon $|V_1\rangle$ entering through the first incident optical path and having the second polarization direction is guided to the N-th exit optical path, and the photon $|V_2\rangle$ entering through the second incident optical path and having the second polarization direction is guided to the (N−1)-th exit optical path. In this manner, the photon $|V_N\rangle$ entering through the N-th incident optical path and having the second polarization direction is guided to the first exit optical path. Provided that the polarization directions of the photons are not changed in the light-guide step, a superposition state $|\Psi_{in}\rangle$ of photon pairs $|H_1, V_1\rangle$, $|H_2, V_2\rangle$, ..., $|H_N, V_N\rangle$ are converted to a superposition state $|\Psi_{out}\rangle$ of photon pairs $|H_{1'}, V_{N'}\rangle$, $|H_{2'}, V_{N-1'}\rangle$, ..., $|H_{N'}, V_{1'}\rangle$. The term "$|H_{i'}, V_{j'}\rangle$" here indicates a state vector of a photon pair composed of a photon $|H_{i'}\rangle$ outputted from the i'-th exit optical path and having the first polarization direction and a photon $|V_{j'}\rangle$ outputted from the j'-th exit optical path and having the second polarization direction.

That is, the quantum entangled photon pair producing method has such an effect that quantum entangled photon pairs $|\Psi_{out}\rangle$ of N channels, which have polarization entanglement, can be produced.

Additionally, the light-guide step of the present invention may be one that converts the polarization directions of the photons from the first polarization direction to the second polarization direction, or from the second polarization direction to the first polarization direction. Even in this case, a superposition state $|\Psi_{in}\rangle$ of photon pairs $|H_1, V_1\rangle$, $|H_2, V_2\rangle$, ..., $|H_N, V_N\rangle$ is still converted to a superposition state $|\Psi_{out}\rangle$ of photon pairs $|H_{1'}, V_{N'}\rangle$, $|H_{2'}, V_{N-1'}\rangle$, ..., $|H_{N'}, V_{1'}\rangle$, and thereby producing quantum entangled photon pairs $|\Psi_{out}\rangle$ of N channels, which have polarization entanglement.

For a fuller understanding of the nature and advantages of the invention, reference should be made to the ensuing detailed description taken in conjunction with the accompanying drawings.

DESCRIPTION OF REFERENCE NUMERALS 100, 200: QUANTUM ENTANGLED PHOTON PAIR PRODUCING DEVICE
110: SUPERPOSITION STATE GENERATING MEANS
101: LASER SOURCE
102: NONLINEAR OPTICAL CRYSTAL
103: SLIT PLATE
120: LIGHT-GUIDE MEANS
104: POLARIZING BEAM SPLITTER
104': FUNCTION SURFACE
105, 107: QUARTER-WAVE PLATE
106: REFLECTIVE MIRROR
108: RETURNING MIRROR
109: SPLIT MIRROR
130: SUPERPOSITION STATE GENERATING MEANS
132: BEAM SPLITTER
133: WAVE-GUIDING TYPE QUASI PHASE MATCHING ELEMENT

BEST MODE FOR CARRYING OUT THE INVENTION

One embodiment of a quantum entangled photon pair producing device according to the present invention is described with reference to FIG. 1.

Figure 1:
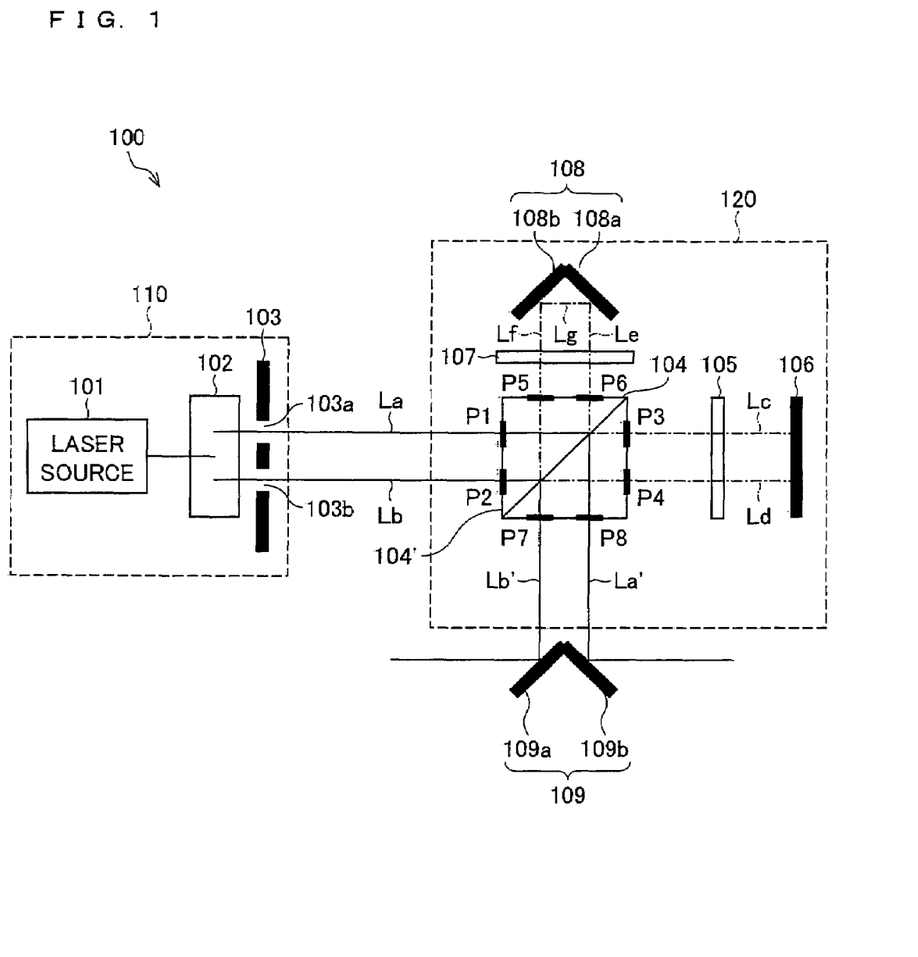
FIG. 1 shows an embodiment of the present invention, and is a schematic block diagram of a quantum entangled photon pair producing device.

FIG. 1 is a schematic block diagram of a quantum entangled photon pair producing device 100. As illustrated in FIG. 1, the quantum entangled photon pair producing device 100 includes mainly (1) a superposition state generating means 110 for generating a superposition state of photon pairs entering through two different incident optical paths and being composed of photons having different polarization directions; and (2) a light-guide means 120 for separating each of the photon pairs entering through the two incident optical paths, into a photon having horizontal polarization and a photon having vertical polarization, and for guiding to a first exit optical path the photon entering through a first incident optical path and having the horizontal polarization and the photon entering through a second incident optical path and having the vertical polarization, and also guiding to a second exit optical path the photon entering through the second incident optical path and having the horizontal polarization and the photon entering through the first incident optical path and having the vertical polarization. The superposition state generating means 110 and the light-guide means 120 are described below in order.

(Superposition State Generating Means)

The superposition state generating means 120 provided in the quantum entangled photon pairs producing device 100, as illustrated in FIG. 1, includes a laser source 101, a nonlinear optical crystal 102, and a slit plate 103.

The laser source 101 outputs a laser beam to the nonlinear optical crystal 102. The laser beam outputted from the laser source 101 enters the nonlinear optical crystal 102 provided on an optical axis of the laser beam. The nonlinear optical crystal 102 utilizes the entered laser beam as pump light to produce photon pairs by parametric down-conversion. The photon pair produced in the nonlinear optical crystal 102 is composed of two photons having a polarization direction perpendicular to each other.

The superposition state generating means 110 provided in the quantum entangled photon pair producing device 100, as illustrated in FIG. 1, further includes the slit plate 103. The slit plate 103 is double-slit, that is, a slit plate having two slits as a slit 103a and a slit 103b, and separates the optical path of the photon pairs outputted from the nonlinear optical crystal 102 into an incident optical path La passing through the slit 103a and an incident optical path Lb passing through the slit 103b. The incident optical path Lb runs parallel to the incident optical path La.

Each of the slit 103a and the slit 103b allows passage of the photon pair without separating the photon pair into two photons. Therefore, the photon pair outputted from the nonlinear optical crystal 102 passes through either one of the slit 103a and the slit 103b without being separated into two photons. A photon pair state |Ψ$_{in}$⟩ after passing through the slits becomes a superposition state of a state |H$_a$, V$_a$⟩ in which both photons pass together through the slit 103*a* and a state |H$_b$, V$_b$⟩ in which both photons pass together through the slit 103*b*.

$$|\psi_{in}\rangle = \frac{1}{\sqrt{2}}(|H_a, V_a\rangle + e^{i\phi}|H_b, V_b\rangle) \quad \text{Equation 1}$$

where Φ is a relative phase of a state vector |H$_b$, V$_b$⟩ with respect to a state vector |H$_a$, V$_a$⟩.

A photon pair state |Ψ$_{in}$⟩ that the photon pair has immediately after passing through the slit 103 is a spatially entangled state, but not a polarization entangled state. That is, the two photons composing the photon pair have a quantum correlation with regard to the slit to pass, but not with regard to the polarization direction.

(Structure of Light-Guide Means)

The light-guide means 120 provided in the quantum entangled photon pair producing device 100 is a Michelson interferometer including a polarizing beam splitter 104, quarter-wave plates 105 and 107, a reflective mirror 109, a returning mirror 108, and a split mirror 109. The light-guide means 120 is specifically described below with reference to FIG.1.

The polarizing beam splitter 104 is provided on the incident optical paths La and Lb through which the photons outputted from the slits 103*a* and 103*b* pass. A port P1 (P2) is provided at a position that the incident optical path La (Lb) enters the polarizing beam splitter 104. The photon pairs passing through the slit 103*a* (103*b*) enter the polarizing beam splitter 104 through the port P1 (P2).

The polarizing beam splitter 104 includes a function surface 104' that allows passage of the photons having the horizontal polarization and reflects the photons having the vertical polarization. A normal line of the function surface 104' is oriented at 45° with respect to the incident optical paths La and Lb. The photons entering through the incident optical path La (Lb) and having the vertical polarization are reflected at the normal line of the function surface 104', and guided to an optical path Le (Lf), which runs perpendicular to the incident optical path La, through a port P6 (P5). On the other hand, the photons entering through the incident optical path La (Lb) and having the horizontal polarization pass through the function surface 104' of the polarizing beam splitter 104, and are guided to an optical path Lc (Ld) through a port P3 (P4). That is to say, the polarizing beam splitter 104 separates the photon pairs into the photons having the horizontal polarization and the photons having the vertical polarization, and then guides the photons having the horizontal polarization to the optical path Lc or Ld, and guides the photons having the vertical polarization to the optical path Le or Ld.

The quarter-wave plate 105 and the reflective mirror 106 are provided on the optical paths Lc and Ld. A reflecting surface of the reflective mirror 106 is arranged to be perpendicular to the optical paths Lc and Ld. The photons entering the reflective mirror 106 through the optical path Lc (Ld) are reflected by the reflective mirror 106, and re-enter the polarizing beam splitter 104 through the same optical path Lc (Ld). The quarter-wave plate 105 converts horizontally polarized light entering from the side of the polarizing beam splitter 104 into circular polarized light, and converts the circular polarized light re-entering from the reflective mirror 106 into vertically polarized light. Thus, the photons outputted from the port P3 (P4) and having the horizontal polarization re-enter the polarizing beam splitter 104 through the port P3 (P4) as vertically polarized light, as a result of polarization conversion by the quarter-wave plate 105 on the way of entering the reflective mirror 106 and re-entering the polarizing beam splitter 104. Then, the photons re-entering through the port P3 (P4) are reflected by the function surface 104' due to its vertical polarization, and guided to an exit optical path La' (Lb') which runs perpendicular to the optical path Lc (Ld).

On the other hand, the quarter-wave plate 107 and the returning mirror 108 are provided on the optical paths Le and Lf. The returning mirror 108 includes two reflecting surfaces 108*a* and 108*b* oriented at 90° with respect to each other. The reflecting surface 108*b* is provided on the optical path Lf and in a direction parallel to the normal line of the function surface 104' of the polarizing beam splitter 104. The reflecting surface 108*a* is provided on the optical path Le, and is perpendicular to the reflecting surface 108*b*. Thus, the photons entering the returning mirror 108 through the optical path Le are reflected by the reflecting surface 108*a*, and then guided to an optical path Lg, and further reflected by the reflecting surface 108*b*, and thereafter guided to the optical path Lf. Adversely, the photons entering the returning mirror 108 through the optical path Lf are reflected by the reflecting surface 108*b*, and then guided to the optical path Lg, and further reflected by the reflecting surface 108*a*, and thereafter guided to the optical path Le. However, the quarter-wave plate 107 is provided on the optical paths Le and Lf. Thus, the photons outputted from the port P6 (P5) and having the vertical polarization re-enter the polarizing beam splitter 104 through the port P5 (P6) as horizontally polarized light, as a result of polarization conversion by the quarter-wave plate 107, which functions similarly to the quarter-wave plate 105. Then, the photons re-entering through the port P5 (P6) pass through the function surface 104' by reason of being horizontally polarized light, and then guided to the exit optical path Lb' (La').

That is, the light-guide means 120 separates the photon pairs entering through the first incident optical path La and the second incident optical path Lb into the photons having the horizontal polarization (a first polarization direction) and those having the vertical polarization (a second polarization direction). Thereafter, the light-guide means 120 guides the photons entering through the first incident optical path La and having the horizontal polarization and the photons entering through the second incident optical path Lb and having the vertical polarization to the first exit optical path La', and guides the photons entering through the second incident optical path Lb and having the horizontal polarization and the photons entering through the first incident optical path La and having the vertical polarization to the second exit optical path Lb'. In this regard, however, the polarization directions of all the photons are changed from vertical polarization to horizontal polarization, or from horizontal polarization to vertical polarization, after passing through the light-guide means 120.

Moreover, a split mirror 109 can be provided on the exit optical paths La' and Lb'. By means of this, the photons outputted from the exit optical paths La' and Lb' may be reflected and guided to an arbitrary direction. For example, as illustrated in FIG. 1, reflecting surfaces 109*a* and 109*b* are arranged at positions perpendicular to each other, thereby guiding the photons outputted from the exit optical paths La' and Lb' to opposite directions respectively.

(Effect of Light-Guide Means)

The following descries how the light-guide means 120 affects a state |H$_a$, V$_a$⟩ in which both photons pass together through the slit 103*a* and a state |H$_b$, V$_b$⟩ in which both photons pass together through the slit 103*b*. Hereinafter, a state vector of a photon having the horizontal polarization and localized in a port Pi is indicated as $|H_{pi}>$, and a state vector of a photon having the vertical polarization and localized in a port Pi is indicated as $|V_{pi}>$.

Photon pairs in the state $|H_a, V_a>$, that is, photon pairs entering through the incident optical path La, enter the polarizing beam splitter 104 through the port P1 ($|H_{p1}>|V_{p1}>$). On the other hand, photon pairs in the state $|H_b, V_b>$, that is, photon pair entering through the incident optical path Lb, enter the polarizing beam splitter 104 through the port P2 ($|H_{p2}>|V_{p2}>$).

By means of the function surface 104', the photon pairs $|H_{p1}>|V_{p1}>$ entering the polarizing beam splitter 104 through the port P1 are separated into photons having the horizontal polarization and photons having the vertical polarization, and then the photons having the horizontal polarization are outputted from the port P3 ($|H_{p3}>$), and the photons having the vertical polarization are outputted from the port P6 ($|V_{p6}>$).

The photons $|H_{p3}>$ outputted from the port P3 re-enter the port P3 as vertically polarized light ($|V_{p3}>$), as a result of the polarization direction being turned 90° by means of the quarter-wave plate 105 in process of reciprocating in the optical path Lc. Then, the vertically polarized light is reflected by the function surface 104', thereby outputted to the exit optical path Lb' through the port P8 ($|V_{p8}>$).

Therefore, the photons entering through the incident optical path La and having the horizontal polarization are changed to vertically polarized light and guided to the exit optical path La' by going through the processes below.

$$|H_a> \rightarrow |H_{p1}> \rightarrow |H_{p3}> \rightarrow |V_{p3}> \rightarrow |V_{p8}> \rightarrow |V_a>$$

On the other hand, the photons $|V_{p6}>$ outputted from the port P6 enter the port P5 as horizontally polarized light ($|H_{p5}>$) as a result of the polarization direction being turned 90° by means of the quarter-wave plate 107 in process of passing through the optical paths Le, Lg, and Lf. Then, the horizontally polarized light passes through the function surface 104', thereby being outputted to the exit optical path Lb' through the port P7 ($|H_{p7}>$).

Therefore, the photons entering through the incident optical path La and having the vertical polarization are changed to horizontally polarized light and guided to the exit optical path Lb' by going through the processes below.

$$|V_a> \rightarrow |V_{p1}> \rightarrow |V_{p6}> \rightarrow |H_{p5}> \rightarrow |H_{p7}> \rightarrow |H_b>$$

By means of the function surface 104', the photon pairs $|H_{p2}>|V_{p2}>$ entering the polarizing beam splitter 104 through the port P2 are separated into photons having the horizontal polarization and photons having the vertical polarization, and then the photons having the horizontal polarization are outputted from the port P4 ($|H_{p4}>$), and the photons having the vertical polarization are outputted from the port P5 ($|V_{p5}>$).

The photons $|H_{p4}>$ outputted from the port P4 re-enter the port P4 as vertically polarized light ($|V_{p4}>$), as a result of the polarization direction being turned 90° by means of the quarter-wave plate 105, in process of reciprocating in the optical path Ld. Then, the vertically polarized light is reflected by the function surface 104', thereby outputted to the exit optical path La' through the port P7 ($|H_{p7}>$).

Therefore, the photons entering through the incident optical path Lb and having the horizontal polarization are changed to vertically polarized light and guided to the exit optical path Lb' by going through the processes below.

$$|H_b> \rightarrow |H_{p2}> \rightarrow |H_{p4}> \rightarrow |V_{p4}> \rightarrow |V_{p7}> \rightarrow |V_{b'}>$$

On the other hand, the photons $|V_{p5}>$ outputted from the port P5 enter the port P6 as horizontally polarized light ($|H_{p6}>$), as a result of the polarization conversion by the quarter-wave plate 107 to turn their polarization direction by 90° on the way of passing through the optical paths Lf, Lg, and Le. Then, the horizontally polarized light passes through the function surface 104', thereby being outputted to the exit optical path La' through the port P8 ($|H_{p8}>$).

Therefore, the photons entering through the incident optical path Lb and having the vertical polarization are changed to horizontally polarized light and guided to the exit optical path La' by going through the states below.

$$|V_b> \rightarrow |V_{p2}> \rightarrow |V_{p5}> \rightarrow |H_{p6}> \rightarrow |H_{p8}> \rightarrow |H_{a'}>$$

The light-guide means 120 is so designed that a traveling distance in the optical path traveled by each photon that enters through the port P1 and is outputted from the port P7 is equal to a traveling distance in the optical path traveled by each photon that enters through the port P2 and is outputted from the port P8. Therefore, the photons entering the port P1 and P2 are outputted from the port P7 and P8 respectively at the same instant.

In this manner, by means of the light-guide means 120, the photons $|H_a>$ entering through the incident optical path La and having the horizontal polarization and the photons $|V_b>$ entering through the incident optical path Lb and having the vertical polarization are simultaneously guided to the exit optical path La'. Likewise, the photons $|H_b>$ entering through the incident optical path Lb and having the horizontal polarization and the photons $|V_a>$ entering through the incident optical path La and having the vertical polarization are simultaneously guided to the exit optical path Lb'. Therefore, by means of the light-guide means 120, the superposition state of the state $|H_a, V_a>$ in which both photons pass together through the slit 103a and the state $|H_b, V_b>$ in which both photons pass together through the slit 103b is converted into a superposition state $|\Psi_{out}>$ of a state $|V_{a'}, H_{b'}>$ and a state $|V_{b'}, H_{a'}>$.

$$|\Psi_{out}> = \frac{1}{\sqrt{2}}\left(|V_{a'}, H_{b'}> + e^{i\Phi'}|V_{b'}, H_{a'}>\right) \qquad \text{Equation 2}$$

where $\Phi'$ is a relative phase of a state vector $|V_{a'}, H_{b'}>$ with respect to a state vector $|V_{b'}, H_{a'}>$.

The state $|\Psi_{out}>$ after the conversion is a polarization entangled state. That is to say, there is a quantum correlation between the polarization direction of the photon outputted from the exit optical path La' and that of the photon outputted from the exit optical path Lb'. Observation of the polarization direction of the photon outputted from either one of the exit optical paths determines that of the photon outputted from the other exit optical path. Even when a distance between the two photons is increased to a certain extent by being outputted to opposite directions by means of the split mirror 109, as illustrated in FIG. 1, the quantum correlation between the two photons are maintained.

(Modification 1)

The quantum entangled photon pair producing device 100 utilizes such a structure that divides an optical path of the photon pairs into two optical paths by means of the slit plate 103 including the two slits 103a and 103b, however, the present invention is not limited to this structure. That is, a superposition state generating means in the quantum entangled photon pair producing device according to the present invention can be such a structure that divides the optical path of the photon pairs by three or more slits. Moreover, as a slit plate having a number of slits, it is possible to utilize a one-dimensional diffraction granting that has a periodic structure in a direction perpendicular to an optic axis direction of pump light.

Figure 2:
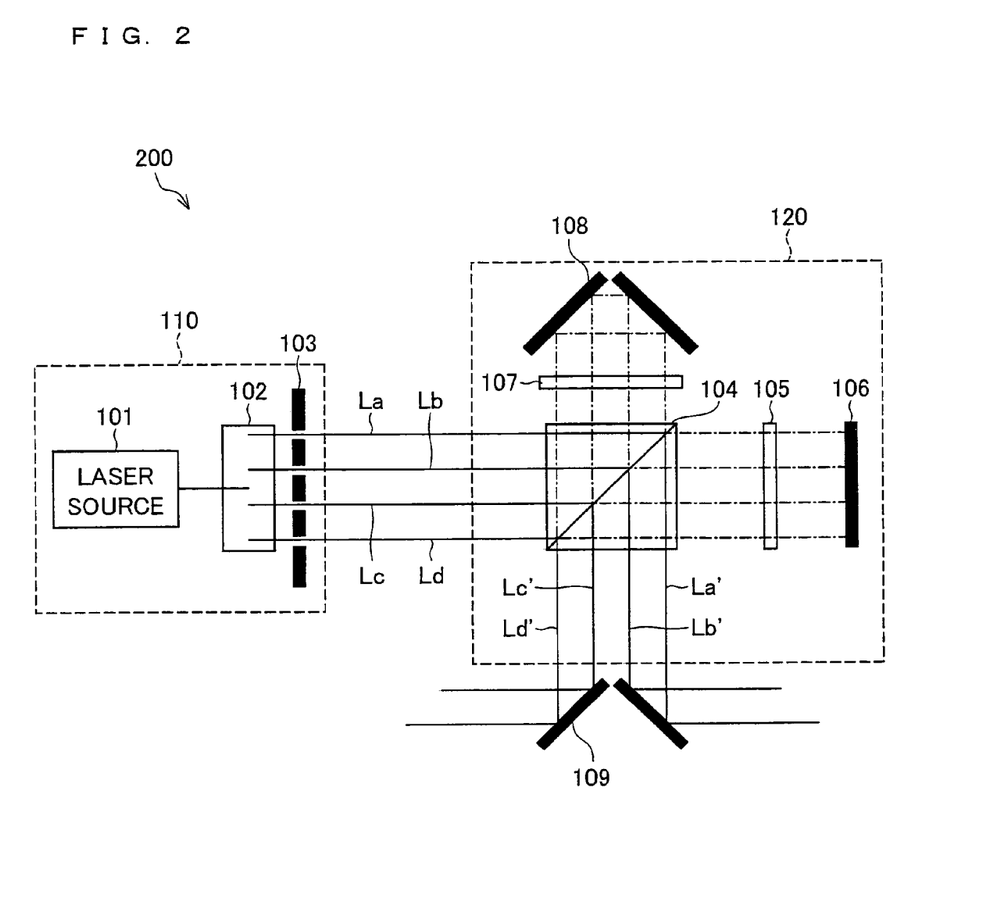
FIG. 2 shows an embodiment of the present invention, and is a schematic block diagram of a quantum entangled photon pair producing device capable of producing quantum entangled photon pairs of 4 channels.

Illustrated in FIG. 2 is a quantum entangled photon pair producing device 200 having 4 slits in the slit plate 103. The quantum entangled photon pair producing device 100 illustrated in FIG. 1 and the quantum entangled photon pair producing device 200 illustrated in FIG. 2 differ only in the number of the slits in the slit plate 103, therefore, corresponding components are labeled in the same manner and their explanation is omitted here.

As illustrated in FIG. 2, the slit plate 103 in the quantum entangled photon pair producing device 200 divides an optical path of entering photon pairs into four incident optical paths La to Ld. The light-guide means 120 in the quantum entangled photon pair producing device 200 is a Michelson interferometer, as is the case with the quantum entangled photon pair producing device 100. The light-guide means 120 in the quantum entangled photon pair producing device 200 separates the photon pairs entering through the four incident optical paths La to Ld into photons having the horizontal polarization and those having the vertical polarization, and thereafter guides the separated photons to four exit optical paths La' to Ld'.

Based on the same principle as the quantum entangled photon pair producing device 100, the light-guide means 120 in the quantum entangled photon pair producing device 200 guides the photons respectively to appropriate exit optical paths as follows: 1) photons $|H_a\rangle$ entering through the first incident optical path La and having the horizontal polarization and photons $|V_b\rangle$ entering through the fourth incident optical path Ld and having the vertical polarization to the first exit optical path La'; 2) photons $|H_b\rangle$ entering through the second incident optical path Lb and having the horizontal polarization and photons $|V_c\rangle$ entering through the third incident optical path Lc and having the vertical polarization to the second exit optical path Lb'; 3) photons $|H_c\rangle$ entering through the third incident optical path Lc and having the horizontal polarization and photons $|V_b\rangle$ entering through the second incident optical path Lb and having the vertical polarization to the third exit optical path Lc'; 4) photons $|H_d\rangle$ entering through the fourth incident optical path Ld and having the horizontal polarization and photons $|V_a\rangle$ entering through the first incident optical path La and having the vertical polarization to the fourth exit optical path Ld'. Under the action of the quarter-wave plate 105 or 107, the polarization direction is reversed by passing through the light-guide means 120. That is to say, the light-guide means 120 in the quantum entangled photon pair producing device 200 converts a superposition state $|\Psi_{in}\rangle$ at entering to a polarization entangled state $|\Psi_{out}\rangle$.

$$|\psi_{in}\rangle = \frac{1}{\sqrt{2}}(|H_a, V_a\rangle + e^{i\phi 2}|H_b, V_b\rangle + e^{i\phi 3}|H_c, V_c\rangle + e^{i\phi 4}|H_d, V_d\rangle) \quad \text{Equation 3}$$

$$|\psi_{out}\rangle = \frac{1}{\sqrt{2}}(|V_{a'}, H_{d'}\rangle + e^{i\phi' 2}|V_{b'}, H_{c'}\rangle + e^{i\phi' 3}|V_{c'}, H_{b'}\rangle + e^{i\phi' 4}|V_{d'}, H_{a'}\rangle) \quad \text{Equation 4}$$

That is, the quantum entangled photon pair producing device 200 produces quantum entangled photon pairs of multi-channel.

(Modification 2)

Figure 3:
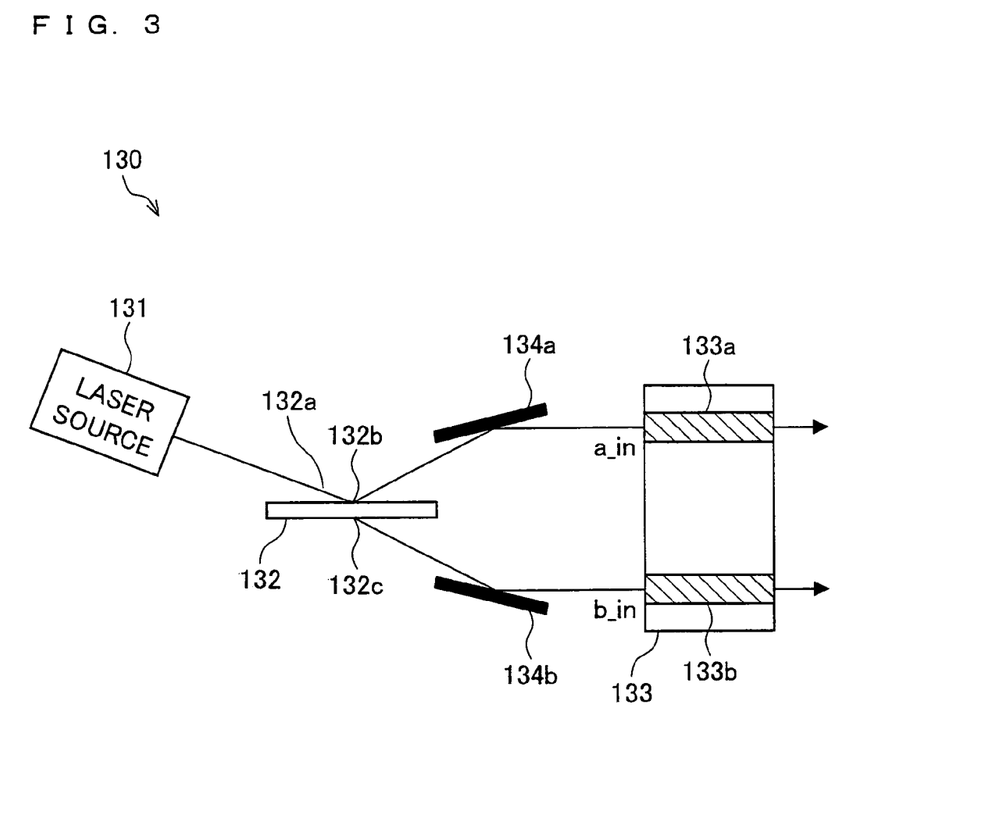
FIG. 3 shows an embodiment of the present invention, and is a schematic block diagram of a superposition state generating means that produces a photon pair in a wave-guiding type quasi phase matching element.

The superposition state generating means according to the present invention is not limited to the slit plate or the one-dimensional diffraction granting as used in the quantum entangled photon pair producing devices 100 and 200. That is, instead of the slit plate 103, the superposition state generating means according to the present invention may be a superposition state generating means 131 including a beam splitter 132 and a wave-guiding type quasi phase matching element 133, as illustrated in FIG. 3.

The superposition state generating means 130 is described below with reference to FIG. 3. The beam splitter 132 divides pump light entered from an entrance port 132a, and then outputs the divided pump light through exit ports 132b and 132c. A mirror 134a (134b) is provided on an optical path of the pump light outputted from the port 132b (132c), and guides the pump light to a wave-guiding path 133a (133b) provided in the wave-guiding type quasi phase matching element 133. The beam splitter 132, the wave-guiding type quasi phase matching element 133, and the mirrors 134a and 134b are arranged at such positions that a distance of the path from the exit port 132b to a wave-guiding path entrance ain is equal to that of the path from the exit port 132c to a wave-guiding path entrance bin. Thus, the wave-guiding paths 133a and 133b output a superposition state $|\Psi_{in}\rangle$ in which a photon pair $|H_a, V_a\rangle$ produced by the wave-guiding path 133a and a photon pair $|H_b, V_b\rangle$ produced by the wave-guiding path 133b are superposed on each other.

By means of the superposition state generating means 130, all the photon pairs produced in the wave-guiding path can be converted into polarization entangled photon pairs, in principle. This consequently attains higher efficiency in production of polarization entangled photon pairs than using the superposition state generating means including slits. This is because, when producing photon pairs by means of the wave-guiding type quasi phase matching element 133, there is no such a photon pair that fails to pass through the slit and to enter the Michealson interferometer. Moreover, when using the superposition state generating means 130, photon pairs can be produced with high efficiency by transmitting pump light in a narrow space (wave-guiding path). Therefore, it becomes possible to increase the probability of occurrence of not only photon pairs including two photons but also photon pairs including more photons, such as four photons or six photons, on the wave-guiding path.

Figure 4:
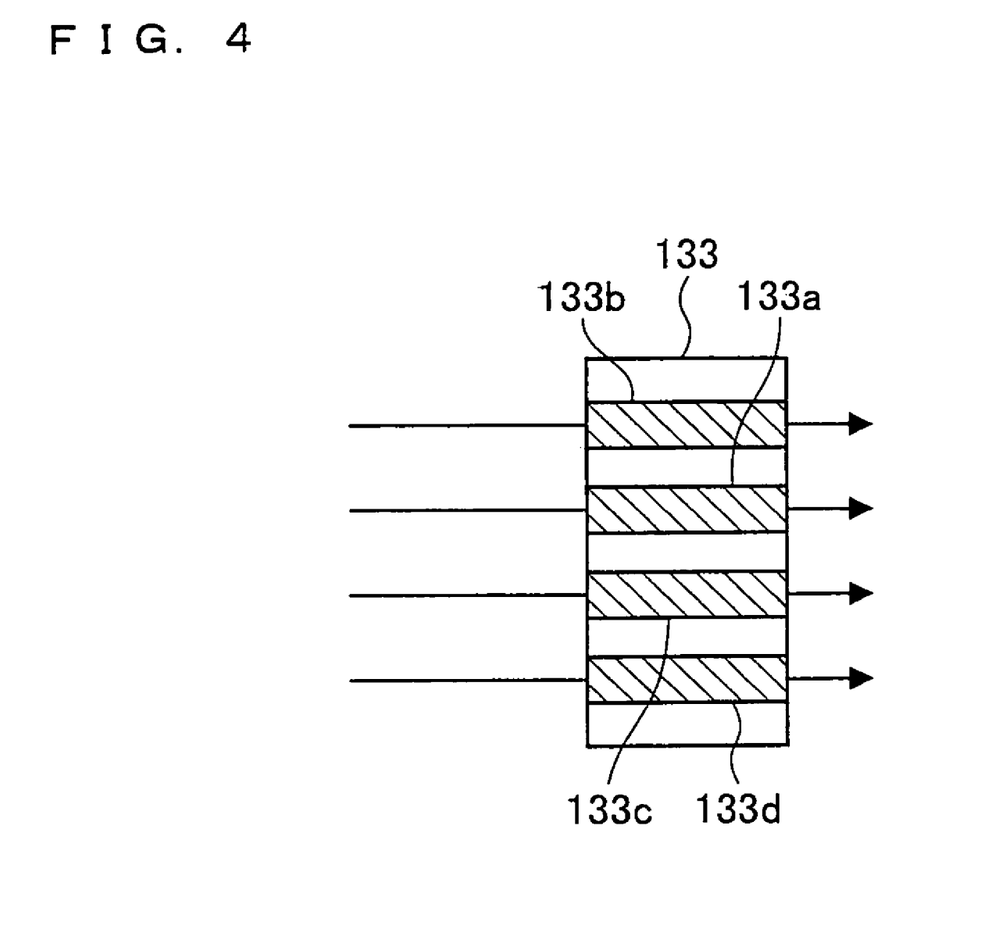
FIG. 4 shows an embodiment of the present invention, and is a schematic block diagram of a wave-guiding type quasi phase matching element applicable to the quantum entangled photon pair producing device capable of producing quantum entangled photon pairs of 4 channels.

Also the superposition state generating means 131 for producing photon pairs by using the wave-guiding type quasi phase matching element 133 may have a larger number of the wave-guiding paths in the wave-guiding type quasi phase matching element 133, thereby enabling to produce a superposition state of photon pairs entering through three or more of the incident optical paths. FIG. 4 illustrates an example of a wave-guiding type quasi phase matching element 133 containing four wave-guiding paths 133a to 133d. By applying the wave-guiding type quasi phase matching element 133 illustrated in FIG. 4 to the quantum entangled photon pair producing device 200, a quantum entangled photon pair producing device capable of producing quantum entangled photon pairs of four channels can be attained with high production efficiency. The quantum entangled photon pair producing device utilizing the wave-guiding type quasi phase matching element containing a larger number of wave-guiding paths as above makes it possible to increase the probability of such a case that several photon pairs are produced at the same instant in different wave-guiding paths.

EXAMPLE

Described below is an experimental result demonstrating that the quantum entangled photon pair producing device according to the present invention produces polarization entangled photon pairs.

Figure 5:
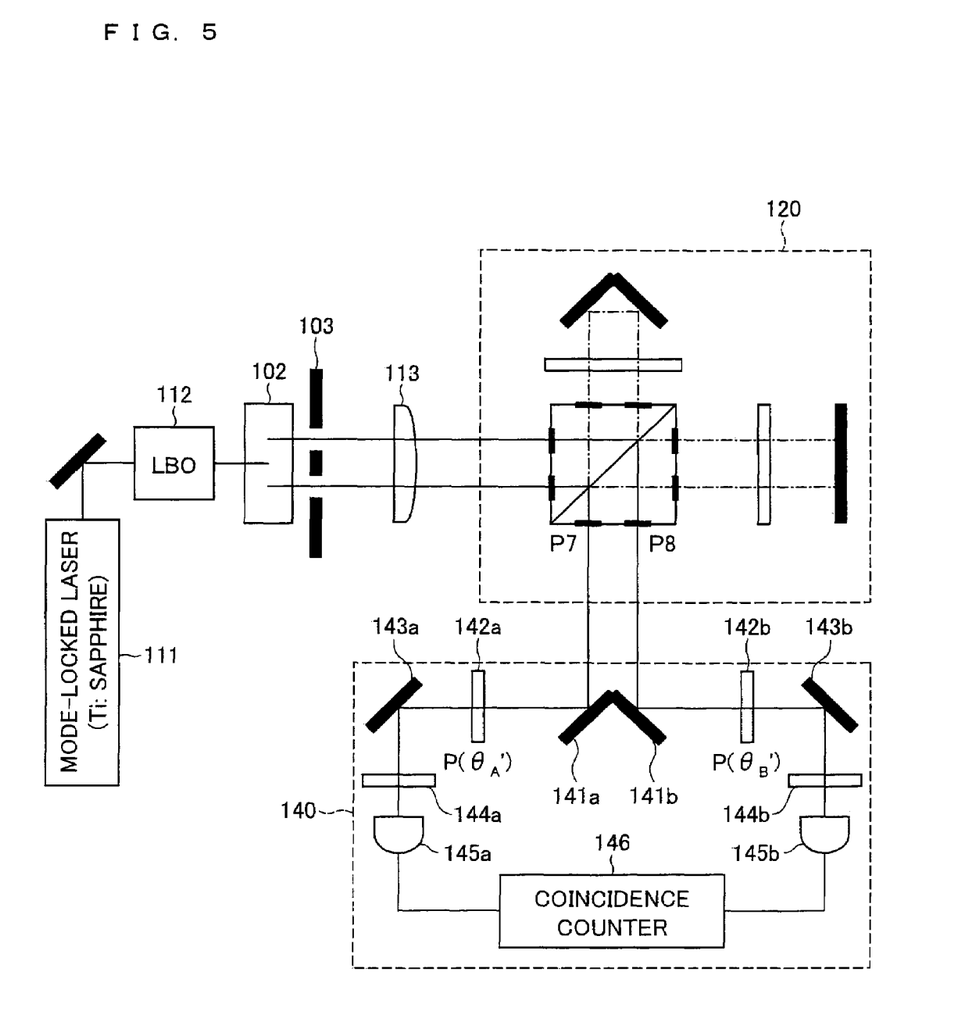
FIG. 5 is a view regarding an example of the present invention, and is a block diagram of an experimental apparatus used for demonstrating that the quantum entangled photon pair producing device according to the present invention produced polarization entangled photon pairs.

FIG. 5 shows a structure of equipment used in the experiment.

As illustrated in FIG. 5, laser beam outputted from a mode-locked laser (Ti: sapphire) 111 and entering a nonlinear optical crystal 102 through a LBO (Lithium Triborate) crystal 112 acted as pump light. A collimating lens 113 was provided on optical paths of photons produced in the nonlinear optical crystal 102 and passing through either one of two slits in a slit plate 103. The photons passing through the collimating lens 113 were guided to a light-guide means 120. A Michealson interferometer having the same structure as the light-guide means 120 illustrated in FIG. 1 was used as the light-guide means 120.

Also, as illustrated in FIG. 5, an observation instrument 140 containing split mirrors 141a and 141b, polarizers 142a and 142b, reflective mirrors 143a and 143b, band pass filters 144a and 144b, avalanche photodiodes 145a and 145b, and a coincidence counter 146 was used in the experiment. The band bass filters 144a and 144b were 3 nm band pass filters whose center wavelength was at 800 nm.

In the observation instrument 140, photons outputted from a port P7 are guided to the polarizer 142a by the split mirror 141a. Then, only photons having polarization direction OA' pass through the polarizer 142a, and thereafter enter the avalanche photodiode 145a through the band pass filter 143. Meanwhile, photons outputted from a port P8 are guided to the polarizer 142b by the split mirror 141b. Then, only photons having polarization direction OB' pass through the polarizer 142b, and thereafter enter the avalanche photodiode 145b through the band pass filter 143b. Once the avalanche photodiodes 145a and 145b detect the photon, an electronic signal is inputted to the coincidence counter 146. The coincidence counter 146 counts the number of times of which the avalanche photodiodes 145a and 145b detect the photon coincidentally.

Coincidence counts were measured with the polarizer angle $\theta_{A'}$ fixed at +45° and the polarizer angle $\theta_{B'}$ varying. The coincidence counts here is the number of times of which the avalanche photodiodes 145a and 145b detected the photon coincidentally, which was counted for 10 seconds by the coincidence counter 146.

Figure 6:
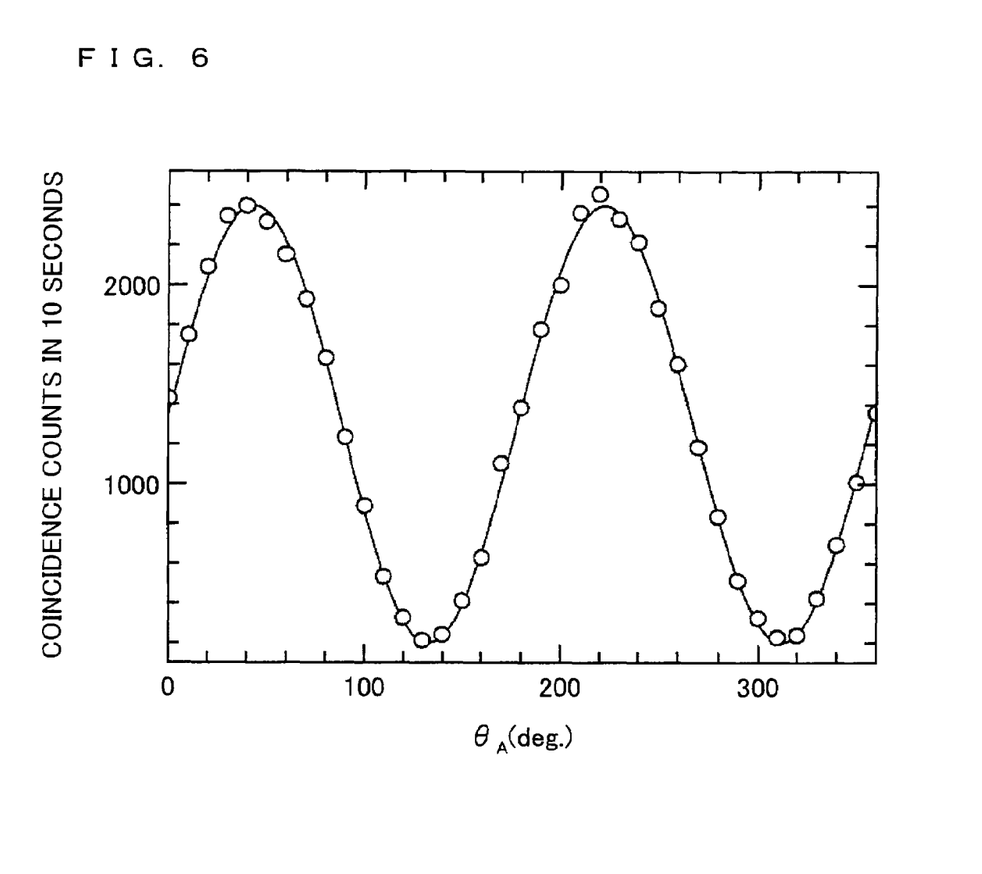
FIG. 6 is a view regarding an example of the present invention, and is a graph demonstrating that the quantum entangled photon pair producing device according to the present invention produced polarization entangled photon pairs.

FIG. 6 is a graph showing a measurement result of the coincidence counts. As shown in FIG. 6, it was determined that the coincidence counts described a sinusoidal form with regard to $\theta_{B'}$, and its local maximum value was obtained when $\theta_{B'}$=+45° ($\theta_{A'}$). That is, it was determined that the photons outputted from the ports P7 and P8 were in a polarization entangled state. Further, visibility shown in FIG. 6 was 85% in accordance with the triplet state given in Equation 2.

Moreover, by using the polarization entangled photon pair obtained as above, Bell's inequality (CHSH inequality) was tested. As a result, Bell parameter S=2.28±0.07, which exceeds the classical limit S=2, was obtained.

By the experiment providing the visibility of 85% and the Bell parameter S=2.28±0.07 that is more than the classical limit S=2, it is demonstrated that the photon pairs produced by the quantum entangled photon pair producing method of the present invention are finely in the polarization entangled state. Based on this, it is found that the quantum entangled photon pair producing device and the quantum entangled photon pair producing method of the present invention are sufficiently applicable to a device for quantum communication achieved by using quantum entangled photons, such as quantum cryptography and quantum teleportation.

[Additional Matters]

The present invention is not limited to the described embodiments and may be varied in many ways within the scope of the following claims. The technical feature of the present invention includes combinations of technical means disclosed respectively in different embodiments.

A quantum entangled photon pair producing device according to the present invention contains superposition state generating means for generating a superposition state of photon pairs entering through an N (N≧2) number of different incident optical paths and composed of photons having different polarization directions, and also contains light-guide means for separating each of the photon pairs entering through the N number of incident optical paths into a photon having a first polarization direction and a photon having a second polarization direction, and guiding the photon entering through an i-th (1≦i≦N) incident optical path and having the first polarization direction and the photon entering through an (N−i+1)-th incident optical path and having the second polarization direction to the i-th exit optical path through optical paths having the same optical path length. Therefore, the quantum entangled photon pair producing device according to the present invention can produce quantum entangled photon pairs $|\Psi_{out}\rangle$ of N channels having polarization entanglement.

A quantum entangled photon pair producing method includes the superposition state generating step for generating a superposition state of photon pairs entering through an N (N≧2) number of different incident optical paths and being composed of photons having different polarization directions, and also includes the light-guide step for separating each of the photon pairs entering through the N number of incident optical paths into a photon having a first polarization direction and a photon having a second polarization direction, and guiding the photon entering through an i-th (1≦i≦N) incident optical path and having the first polarization direction and the photon entering through an (N−i+1)-th incident optical path and having the second optical path to the i-th exit optical path through optical paths having the same optical path length. Therefore, the quantum entangled photon pair producing method according to the present invention enables to produce quantum entangled photon pairs $|\Psi_{out}\rangle$ of N channels having polarization entanglement.

Specific embodiments or examples implemented in BEST MODE FOR CARRYING OUT THE INVENTION only show technical features of the present invention and are not intended to limit the scope of the invention. Variations can be effected within the spirit of the present invention and the scope of the following claims.

INDUSTRIAL APPLICABILITY

The quantum entangled photon pair producing device of the present invention is applicable to a device or method for quantum communication achieved by using quantum entangled photons.

The invention claimed is:

1. A quantum entangled photon pair producing device comprising superposition state generating means and light-guide means, wherein:

the superposition state generating means generates a superposition state of photon pairs entering the light guide means from a same direction through an N (N≧2) number of different incident optical paths which are parallel to each other, the photon pair being composed of photons having different polarization directions; and the light-guide means separates each of the photon pairs entering from a same direction through the N number of incident optical paths into a photon having a first polarization direction and a photon having a second polarization direction, and guides the photon entering through an i-th (1≦i≦N) entrance optical path and having the first polarization direction and the photon entering through an (N−i+1)-th incident optical path and having the second polarization direction to the i-th exit optical path through optical paths having a same optical path length.

2. The quantum entangled photon pair producing device according to claim 1, wherein the superposition state generating means including:

a nonlinear optical crystal for producing photon pairs from pump light entered the nonlinear optical crystal; and a slit for allowing transmission of the photon pairs produced by the nonlinear optical crystal without separating into individual photons, and for dividing an optical path of the photon pairs into incident optical paths in number of N.

3. The quantum entangled photon pair producing device according to claim 1, wherein the superposition state generating means including:

a beam splitter for dividing, into optical paths in number of N, an optical path of pump light entered the beam splitter; and a wave-guiding type quasi phase matching element having wave-guiding paths in number of N for producing photon pairs from the pump light divided by the beam splitter and for allowing the photon pairs enter the incident optical paths.

4. The quantum entangled photon pair producing device according to claim 1, wherein the light-guide means is a Michelson interferometer.

5. The quantum entangled photon pair producing device according to claim 1, wherein N is not less than 3.

6. A quantum entangled photon pair producing method comprising:

a superposition state generating step for generating a superposition state of photon pairs entering light-guide means from a same direction through an N (N≧2) number of different incident optical paths which are parallel to each other, the photon pair being composed of photons having different polarization directions; and a light-guide step for, by using the light-guide means, separating each of the photon pairs entering from a same direction through the N number of incident optical paths into a photon having a first polarization direction and a photon having a second polarization direction, and guiding the photon entering through an i-th (1≦i≦N) incident optical path and having the first polarization direction and the photon entering through an (N−i+1)-th entrance optical path and having the second polarization direction to the i-th exit optical path through optical paths having a same optical path length.

7. The quantum entangled photon pair producing device according to claim 2, wherein the light-guide means is a Michelson interferometer.

8. The quantum entangled photon pair producing device according to claim 3, wherein the light-guide means is a Michelson interferometer.

9. The quantum entangled photon pair producing device according to claim 2, wherein N is not less than 3.

10. The quantum entangled photon pair producing device according to claim 3, wherein N is not less than 3.

11. The quantum entangled photon pair producing device according to claim 4, wherein N is not less than 3.

\* \* \* \* \*